(12) United States Patent
Hösker

(10) Patent No.: US 9,908,575 B2
(45) Date of Patent: Mar. 6, 2018

(54) OVERHEAD CONVEYING DEVICE HAVING SUPPORT FRAMEWORK MODULES

(71) Applicant: Torsten Hösker, Osterburken (DE)

(72) Inventor: Torsten Hösker, Osterburken (DE)

(73) Assignee: Torsten Hösker, Osterburken (DE)

( * ) Notice: Subject to any disclaimer, the term of this patent is extended or adjusted under 35 U.S.C. 154(b) by 0 days.

(21) Appl. No.: 14/900,326

(22) PCT Filed: May 22, 2014

(86) PCT No.: PCT/EP2014/060533
§ 371 (c)(1),
(2) Date: Apr. 11, 2016

(87) PCT Pub. No.: WO2015/000635
PCT Pub. Date: Jan. 8, 2015

(65) Prior Publication Data
US 2016/0207579 A1 Jul. 21, 2016

(30) Foreign Application Priority Data

Jul. 5, 2013 (DE) .......................... 10 2013 213 222

(51) Int. Cl.
*B65G 21/00* (2006.01)
*B62D 65/18* (2006.01)
*B65G 41/00* (2006.01)

(52) U.S. Cl.
CPC ........... *B62D 65/18* (2013.01); *B65G 41/006* (2013.01)

(58) Field of Classification Search
CPC ........ B62D 65/18; B65G 21/02; B65G 21/00; B65G 21/20; B65G 41/006

(Continued)

(56) References Cited

U.S. PATENT DOCUMENTS 3,156,018 A * 11/1964 Slayter .................... E04B 1/348
52/223.7
5,078,250 A * 1/1992 Cole ....................... B65G 21/00
193/35 R (Continued)

FOREIGN PATENT DOCUMENTS

CN 102114594 A 7/2011
DE 3607020 A1 9/1986

(Continued)

OTHER PUBLICATIONS

PCT International Search Report, PCT/EP2014/060533, dated Sep. 16, 2014.

(Continued)

*Primary Examiner* — William R Harp
(74) *Attorney, Agent, or Firm* — Quarles & Brady LLP

(57) ABSTRACT

An overhead conveying device for integration in an assembly plant in order to transport components, said overhead conveying device having a supporting framework and a conveying device mounted on the supporting framework. The supporting framework and the conveying device form a conveying corridor, in which the components can be transported in a direction of the conveying corridor from an input point to an output point. The device further includes support columns supporting the support framework. A free space, which is suitable for component assembly and/or component transport and which can be walked and/or driven through, is formed beneath the supporting framework. The supporting framework is formed from at least two supporting framework modules arranged one after another in the direction of the conveying corridor.

13 Claims, 7 Drawing Sheets

(58) Field of Classification Search
USPC .............................. 198/346.1, 860.1, 860.2
See application file for complete search history.

(56) References Cited

U.S. PATENT DOCUMENTS

| | | | |
|---|---|---|---|
| 6,419,983 B1 | 7/2002 | Kreuzer | |
| 9,045,182 B2* | 6/2015 | Cardani | ................. B23P 19/06 |
| 2011/0154654 A1* | 6/2011 | Cardani | ................. B23P 19/06 |
| | | | 29/795 |
| 2015/0239078 A1 | 8/2015 | Cardani et al. | |

FOREIGN PATENT DOCUMENTS

| | | |
|---|---|---|
| DE | 19806963 A1 | 10/1998 |
| DE | 60202985 T2 | 4/2006 |
| DE | 202009006856 U1 | 9/2009 |
| DE | 102011008623 A1 | 7/2012 |
| DE | 102012009061 A1 | 11/2013 |
| DE | 102012214127 A1 | 2/2014 |
| EP | 2340982 A1 | 6/2011 |
| JP | 2003341818 A | 12/2003 |
| JP | 2008222137 A | 9/2008 |
| JP | 2009012141 A | 1/2009 |

OTHER PUBLICATIONS

PCT English Language Translation of the International Preliminary Report on Patentability, PCT/EP2014/060533, dated Jan. 14, 2016.
State Intellectual Property Office of People's Republic of China, First Office Action and Search Report, Application No. 201480038585.4, dated Feb. 21, 2017.

* cited by examiner

OVERHEAD CONVEYING DEVICE HAVING SUPPORT FRAMEWORK MODULES

CROSS-REFERENCE TO RELATED APPLICATIONS

This application represents the national stage entry of PCT International Application No. PCT/EP2014/060533 filed May 22, 2014 and claims priority to German Patent Application No. 10 2013 213 222.0 filed Jul. 5, 2013. The contents of this application are hereby incorporated by reference as if set forth in their entirety herein.

TECHNICAL FIELD

The invention relates to an overhead conveying device for integration in an assembly plant, which is suitable for transporting vehicle components.

BACKGROUND

In assembly plants for manufacturing vehicles, different types of conveying devices as well as of overhead conveying devices are employed. Based on the fact that assembly plants are individually adjusted to each type of vehicle to be manufactured and that the conveying devices are correspondingly configured, the overhead conveying devices under consideration are correspondingly individually designed and manufactured. Here, an overhead conveying device of the type at hand relates to those conveying devices below which at least enough free movement space remains to allow a person to freely walk below them. Usually, free headroom of at least 2.5 m or more is the aim so that forklift trucks or other transport vehicles are also able to cross below the overhead conveying device. Overhead conveying devices of this kind are also employed in order to obtain additional assembly space, wherein, standing on the floor, another conveying device or another kind of assembly machine, such as an assembly robot, may be arranged underneath the overhead conveying device. To integrate overhead conveying devices of this kind into a complete assembly plant in a building, it is common in the state of the art to put a supporting framework together from steel girders or the like for erecting the actual conveying device on-site in the building, wherein the struts and pillars are usually welded together on the construction site. This allows for an adaptation to the conditions at hand both with regard to the assembly plants and with regard to the facilities of the building, and assembly plants or building facilities already present can in particular be taken into account.

For a start, the generic overhead conveying device is intended for integration in an assembly plant for transporting vehicle components. The type of the vehicle components is irrelevant in this case. The substantial feature is that the overhead conveying device is integrated in a complete assembly concept, making it possible here to manufacture a vehicle by transporting the assigned vehicle parts. For this purpose, the overhead conveying device has a supporting framework and at least one conveying device.

Generically speaking, the supporting framework has a length greater than 5 m and a width greater than 2 m. The height at which the supporting framework of the overhead conveying device is affixed above the floor of the designated building is irrelevant for the invention at hand, but the free headroom below the supporting framework has to be at least 2 m so as to guarantee a suitable useful height below the supporting framework. The supporting framework itself is realized by longitudinally and/or transversely oriented or diagonally interconnected supporting beam elements. Said supporting beam elements are usually designed in the shape of rods and can have tubular profiles, T-girders or other shapes and they can be designed as traction girders, pressure girders or as girders under a bending moment.

The associated conveying device is mounted on the supporting framework and allows transporting corresponding vehicle components, the transport usually taking place along the longitudinal direction of the overhead conveying device.

Furthermore, the supporting framework comprises bearing means on which the overhead conveying device is borne in the assembly plant. It is initially irrelevant whether said bearing means are fixed bearings, mobile bearings or other types of bearings. The supporting framework is at least substantially supported on the bearing means in the direction of gravity and on counter-bearings being provided by the assembly plant or by the building.

The commonly found practice of putting the supporting framework together on site on the basis of the local conditions leads to structural calculations and a previous detailed construction of the supporting framework of the overhead conveying device usually not being carried out. Due to these insufficient calculations of the supporting framework, said supporting framework, for safety reasons, is usually designed with a significant oversize, which, however, does not guarantee that sufficient safety is given, either.

However, the design of an overhead conveying device known from the state of the art is particularly disadvantageous in the light of the high amount of time that is required for setting up the corresponding components in the assembly plant. During such setup works, the assembly plant is inevitably unavailable for other purposes in the area of the overhead conveying device to be constructed. In particular when making structural alterations to the assembly plant, switching from one design, for instance for manufacturing a particular vehicle model, to a new design of the assembly plant for manufacturing a changed vehicle model, this leads to undesired production downtimes while the overhead conveying device is being set up.

SUMMARY

Therefore, it is the object of the invention at hand to improve the procedure of setting up an overhead conveying device in an assembly plant to avoid the described disadvantages.

The basic idea of the overhead conveying device in accordance with the invention is that the supporting framework is formed from at least two supporting framework modules arranged one after another in the direction of the conveying corridor. Owing to the modular composition of the supporting framework, it is possible to reduce the production costs and the assembly effort considerably. In this way, by combining several supporting framework modules, the supporting framework may individually be adapted to the respective profile of requirements. In particular, the size of the supporting framework may ultimately infinitely be increased by adding further supporting framework modules. The individual supporting framework modules can be manufactured and mounted in a cost-effective fashion by using nonvariable parts. As a result, it is thus possible to assort the supporting framework from a set of modules, wherein mass-production of the individual components of the set of modules, namely of the individual supporting framework modules, is possible.

In order to simplify assembling the supporting framework from the individual supporting framework modules, it is particularly advantageous if fastening devices are disposed at the transition between adjacent supporting framework modules. Said fastening devices make it possible to connect adjacent supporting framework modules, so that the supporting framework, because of this, receives the necessary stability. The fastening devices may, for instance, be laid out in the manner of fastening flanges, which are connected to one another by way of connecting screws.

In the basic form of the overhead conveying device in accordance with the invention, an input supporting framework module, at which the input point for the vehicle components is disposed, and an output supporting framework module, at which the output point for the vehicle components is disposed, are necessary. Owing to the combination of an input supporting framework module with an output supporting framework module, a supporting framework for manufacturing an overhead conveying device in accordance with the invention can be manufactured.

In order to be able to expand the length of the supporting framework of the overhead conveying device in accordance with the invention at will, so-called intermediate supporting framework modules are to be provided. One or more intermediate supporting framework modules are then arranged between the input supporting framework module and the output supporting framework module, so that the length of the supporting framework all in all results from the addition of the length of the individual supporting framework modules.

Regarding the costs, particular advantages result if the intermediate supporting framework modules are in each instance embodied so as to be substantially identical in construction, so that mass-production is possible for said modules.

By using the supporting framework modules in accordance with the invention, overhead conveying devices ultimately having any length may be manufactured. Increasing the length of the supporting framework is accompanied by problems regarding vibrations and thermal expansion, though. In order to solve these problems, it is therefore particularly advantageous if compensating elements are arranged between adjacent supporting framework modules. Said compensating elements may, for instance, be configured to be elastic or moveable in order to cushion vibrations between the individual supporting framework modules and/ or to relieve thermal stresses due to the longitudinal extensions.

In accordance with a preferred embodiment, it is envisaged that the bearing means for supporting the supporting framework module in the desired height are embodied in the manner of column gantries. In this context, said column gantries are characterized in that there are at least two support columns whose lower ends are affixed on the floor of the assembly plant. Further, the column gantry comprises a transverse bridge, which is affixed between the two support columns. The supporting framework modules may be placed onto said transverse bridge from the top. Using column gantries for supporting the supporting framework module makes it possible to erect the overhead conveying device step by step from prefabricated components. When assembling the overhead conveying device, the column gantries may initially be positioned one by one and be fixed to the factory floor. Subsequently, the supporting framework modules, in a prefabricated form, may then be placed onto the transverse bridges of the column gantries, for which purpose, for instance, a suitable lifting vehicle may be employed, such as a sufficiently large forklift truck. As a result, the assembly time for setting up the overhead conveying device may significantly be shortened. Also, the mechanical stability of the column gantries can be calculated easily, so that the usual oversize is not required. Also, the supporting framework module that is placed onto the transverse bridges may be optimally aligned and adjusted before the supporting framework modules are fastened to the transverse bridges.

In accordance with a preferred embodiment, it is envisaged that a separating plane runs between the column gantries and the supporting framework module, wherein fastening means, with which the supporting framework modules can be fixed on the column gantry, reach over the separating plane. Fastening means in this context are considered to be, for instance, fastening screws, fastening bolts or also welded seams. Owing to the continuous separating plane between the column gantries on the one hand and the supporting framework module on the other hand, it is made possible that the position of the supporting framework modules can be optimally adjusted once the same have been placed onto the transverse bridges of the column gantries.

In order to guarantee the highest possible stability of the overhead conveying device, it is particularly advantageous if the support columns and/or the transverse bridges of the column gantry have been manufactured from tubular material with a closed tubular cross-section. In particular tubes with a rectangular or square cross-section are eminently suitable for manufacturing the column gantry.

The manner in which the transverse bridge is connected to the support columns so as to form the column gantry of the overhead conveying device in accordance with the invention is generally optional. In view of the highest possible stability, it is particularly advantageous if the upper ends of the support columns and/or the lateral ends of the transverse bridges are miter-cut and the surfaces of the end cross-sections of the two support columns come into flush contact with the surfaces of the end cross-sections of the transverse bridge.

Any types of fastening means are conceivable for fixing the end cross-sections of the transverse bridge on the one hand and of the support columns on the other hand. Particularly high stability is achieved if the end cross-sections are welded together.

The column gantry required for forming the overhead conveying device in accordance with the invention has an especially large cross-section because of its gantry-shaped structure so that a correspondingly large transport space is necessary when transporting the column gantry. In order to reduce the transport space necessary for transporting the column gantry, it is therefore particularly advantageous if the support columns are embodied in two parts, wherein the two parts of the support columns can be connected to each other in a connecting point. The separating point of the support columns should ideally be located in proximity to the adjoining point with the transverse bridge of the column gantry. As a result, the column gantry can thus be disassembled into three pieces, each of which has a substantially axial longitudinal extension and can be correspondingly transported within very little transport space. At the actual usage site, the column gantry can be put together by mounting the lower parts of the support columns to the upper parts of the support columns, which are connected to the transverse bridge. In order to fasten the supporting framework modules to the transverse bridge after erection of the column gantries, it is particularly advantageous if fastening straps are disposed at the transverse bridge. The manner of arrangement of the fastening straps can additionally predefine a specific orientation of the supporting framework module relative to the column gantries.

In accordance with the invention, the integration of the overhead conveying device in an assembly plant is achieved with little idle times as a result of erecting the overhead conveying device by a self-supporting design of the supporting framework module and by preassembly of the supporting framework module. The supporting framework modules can be transported in preassembled form from the place of manufacture to the place of use.

It is particularly advantageous if both the supporting framework modules and the conveying device are preassembled on the supporting framework modules before being erected at the place of use. The supporting framework modules, along with the conveying device that is arranged thereon, can be transported in preassembled form from the place of manufacture to the place of use.

It is obvious that, for integrating the conveying device in the assembly plant, several interface connections need to be connected, whether they are power connections, data connections or process lines, such as pressurized air or hydraulic oil, between the preassembled overhead conveying device and the rest of the assembly plant.

It is at least required in accordance with the invention that the actual supporting framework module is already preassembled and, furthermore, that the conveying device is advantageously mounted on the supporting framework module prior to erection at the place of use. Thus, all that is needed for realizing the overhead conveying device in the assembly plant is clearing corresponding space and creating corresponding counter-bearings for receiving the bearing means, wherein the preassembled overhead conveying device then has to be erected only by means of a crane. Hereby, the assembly time for erecting the overhead conveying device is drastically reduced as compared to all known devices. Even though this is associated with a slight disadvantage with regard to flexible adaptation to the local realities, the advantages with regard to little idling of the assembly plant prevail.

It is particularly advantageous if the supporting framework modules are designed in the manner of a spatial truss. This means that the self-supporting supporting framework module is formed by longitudinally oriented, transversely oriented, diagonal and upright interconnected supporting beam elements. This truss structure can guarantee high stiffness of the supporting framework modules while weight is low, which in particular facilitates the transport of the preassembled overhead conveying device.

Furthermore, it is particularly advantageous if the supporting framework modules are formed by a welded structure. This means that the self-supporting supporting framework module is substantially formed by steel struts and, if need be, by other steel elements, such as gusset plates, which are welded together. If the conveying device is light or if saving weight is generally very important, it is also conceivable to manufacture the supporting framework modules from aluminum, for instance, and to similarly weld together the individual elements, such as struts and gusset plates.

As compared to a screwed design, a welded structure has, among other things, the advantage that there is no risk that an inadmissible change to the supporting framework module can later be made by the plant operator. In designs from the state of the art, this might not be critical because of the oversize that is usually present. In a specific configuration of the supporting framework module to fit the conveying device to be supported, a manipulation of the supporting framework module can cause extensive damage, which is counteracted by a welded structure.

Furthermore, it is particularly advantageous if a maintenance walkway is present along at least one longitudinal side of the conveying device. Said maintenance walkway is to be designed in such a manner that it is accessible on foot without any risk. To this end, the maintenance walkway is arranged at a longitudinal side of the supporting framework module and is connected thereto. The maintenance walkway and the supporting framework module can be connected during preassembly of the overhead conveying device, while it is also conceivable to fasten the maintenance walkway to the supporting framework module on site as a per se preassembled attachment part.

It is particularly advantageous if maintenance walkways are present on both sides of the conveying device. To increase the stiffness of the entire arrangement and in particular the stability of the maintenance walkways, the maintenance walkways present on both sides along the conveying device are connected to each other via connecting girders.

In case maintenance walkways are present on both sides and the conveying device is disposed in-between, the maintenance walkways being connected at their ends via connecting girders, it is furthermore particularly advantageous if at least one vertical transport opening is provided. The latter is to be arranged between the supporting framework module, the maintenance walkways and the connecting girders. The vehicle components can then be transported by the conveying device, which is located above the supporting framework module, in a largely vertical direction across the overhead conveying device from above the supporting framework module to a location below the supporting framework module through said vertical transport opening. Thus, vehicle components transported above the supporting framework module can be transferred to another conveying device or to an assembly device below the overhead conveying device.

In this context, it is correspondingly particularly advantageous if corresponding vertical transport openings are disposed at both ends of the conveying device so that vehicle components can be taken over from below the overhead conveying device at one end of the overhead conveying device. Then, the vehicle component can be transported along the overhead conveying device by the conveying device located thereon and can subsequently be transferred again from above the supporting framework module down to below the supporting framework module through the other vertical transport opening at the other end of the overhead conveying device.

If maintenance walkways are present on both sides having the vertical transport opening disposed between them at the end of the supporting framework module, it is furthermore particularly advantageous if a closing means is present that can be adjusted between an open position and a closed position. The closing means is to be designed such that it is accessible on foot and that in the open position it releases the required vertical transport opening for use of the overhead conveying device and that in a closed position it allows passage, advantageously without steps, between the two maintenance walkways. Thus, in case of maintenance being carried out usually at a standstill of the conveying device, the latter can be accessed substantially circumferentially on foot by way of the maintenance walkways and of the connecting closing means.

Since the overhead conveying device is preassembled and the stiffness of the supporting framework module is suitably configured to fit the weight of the overhead conveying device and its weight distribution, it is possible in a particularly advantageous fashion to allow a variable changeable erection of the supporting framework module in the assembly plant. In this way, in particular the disadvantage is compensated that, unlike in the state of the art, an adaptation to the realities encountered on site is impossible, but that instead there has to be a suitable possibility of erecting the overhead conveying device in the assembly plant in its completely preassembled state with defined positions of the bearing means.

Here, it is particularly advantageous if the number $N_L$ of bearing means is higher than the number $N_E$ being required for bearing. This means that a number $N_L$ of bearing means on each of which erection in the assembly plant can take place is present on the supporting framework module, while it is actually unnecessary for erection of the overhead conveying device in the assembly plant that each of these available bearing means is used. Instead, it is sufficient if only the required number $N_E$ of counter-bearings is present. In this context, it is furthermore envisaged that those bearing means to be used among the available bearing means when erecting the overhead conveying device in the assembly plant can be selected arbitrarily in the required number $N_E$. This obviously means that the overhead conveying device can still be borne at all available bearing means in the assembly plant on counter-bearings.

A design that has at least six bearing means is particularly advantageous, the required number $N_E$ being smaller than/equal to the number $N_L$ of available bearing means multiplied by 0.72 and rounded up. This means that in case of six available bearing means, erection is to take place on at least five counter-bearings. In case of seven or eight available bearing means, erection is to take place by means of at least six of the available bearing means. In case of nine available bearing means, seven bearing means are accordingly to be used, and so on. It is particularly advantageous if the stiffness of the supporting framework module is selected such that in particular the number $N_L$ of the available bearing means multiplied by 0.6 and rounded up is only necessary as the required number $N_E$.

Furthermore, it is advantageous if the overhead conveying device has support elements on each of which a bearing means is arranged. In this regard, an advantageous design requires a number of support elements that corresponds to the required number $N_E$ of bearing means, while in an advantageous design a support element is still associated with each bearing means. The support elements can be free-standing support columns and/or wall brackets and/or freely suspended traction elements. It is at least envisaged that the overhead conveying device rests with the supporting framework module at the bearing means on counter-bearings of the support elements, which in turn are connected within the assembly plant or the building.

Here, it is particularly advantageous if the number of support elements is higher than the number $N_E$ being required for bearing, wherein any one of the available support elements can be removed and/or replaced at the place of use without impairing the usability of the overhead conveying device. Thus, a support column can be removed in particular in case of damage if a transport vehicle collides with a support column, for instance, without impairing the functionality of the overhead conveying device with respect to the transport of vehicle components by way of the conveying device while ensuring sufficient statics. In case of damage, an uncomplicated replacement can thus take place without the assembly plant having to stand still.

In the following figures, two overhead conveying devices having a supporting framework module borne on column gantries are outlined as examples.

BRIEF DESCRIPTION OF THE FIGURES

In the figures:

FIG. 6 shows a second exemplary overhead conveying device consisting of three supporting framework modules in a lateral view;

DETAILED DESCRIPTION

Figure 1:
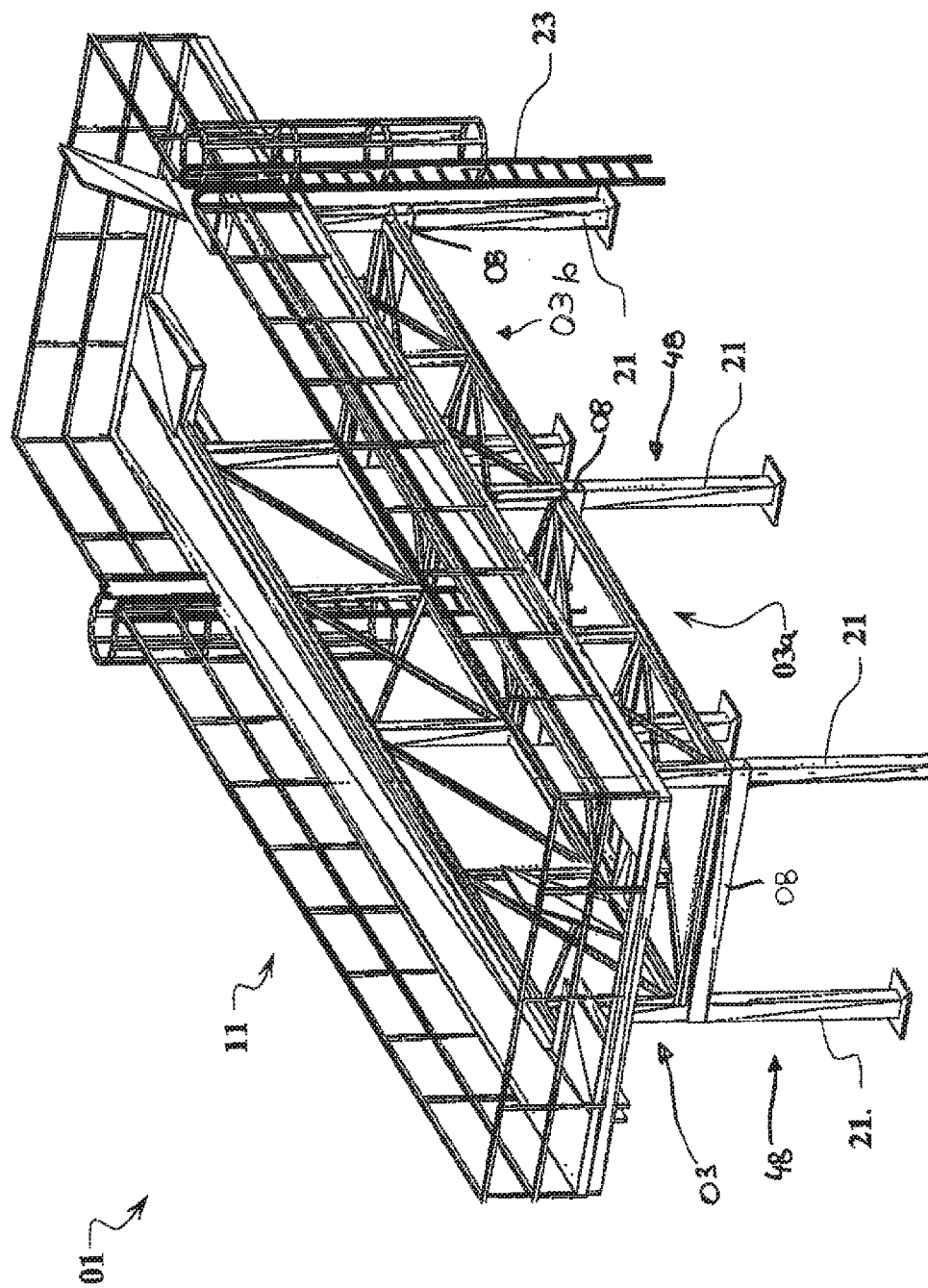
FIG. 1 shows a first exemplary overhead conveying device consisting of two supporting framework modules in a perspective view leaving out the conveying device.
Figure 2:
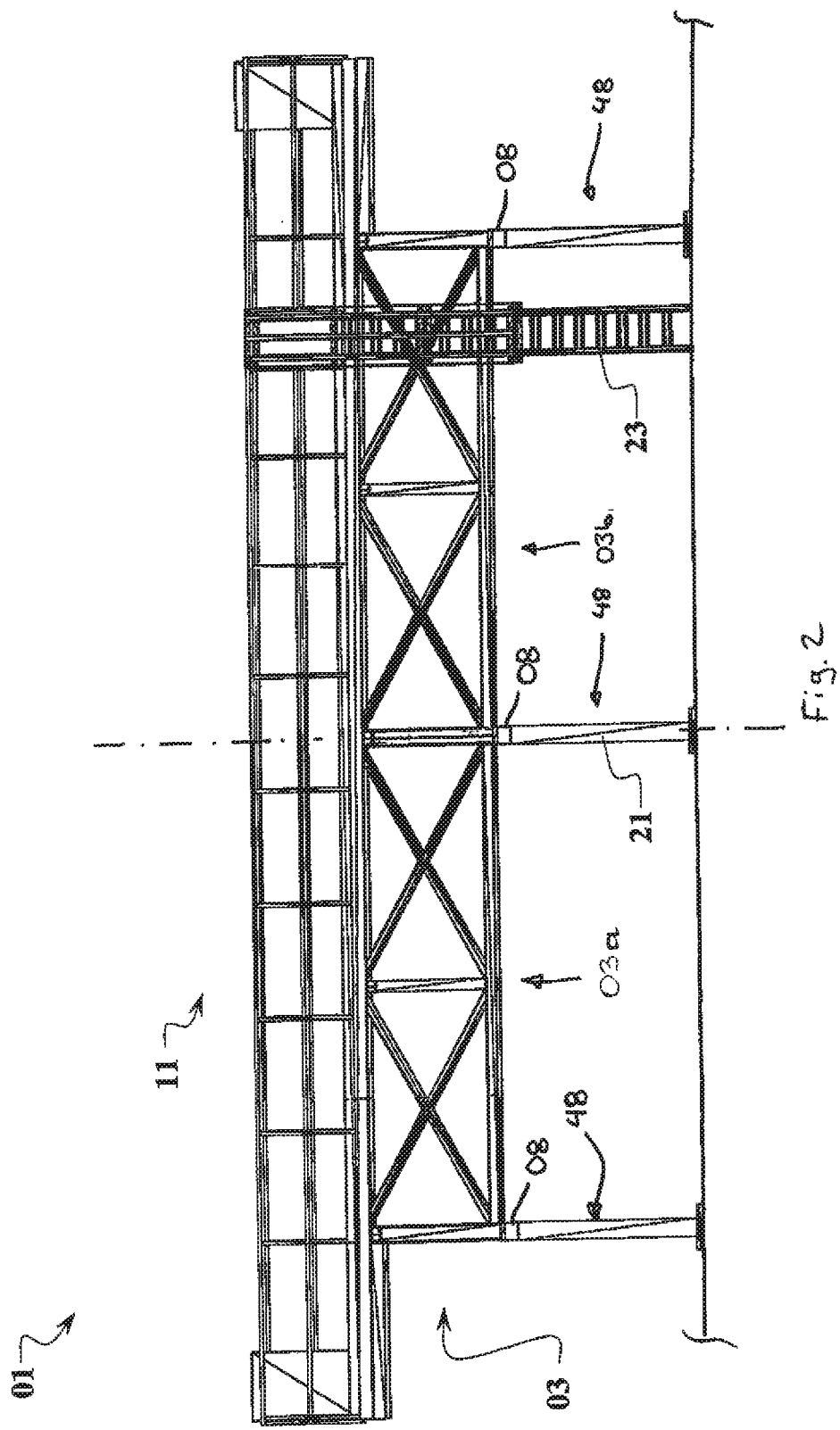
FIG. 2 shows a lateral view of the overhead conveying device in accordance with FIG. 1.
Figure 3:
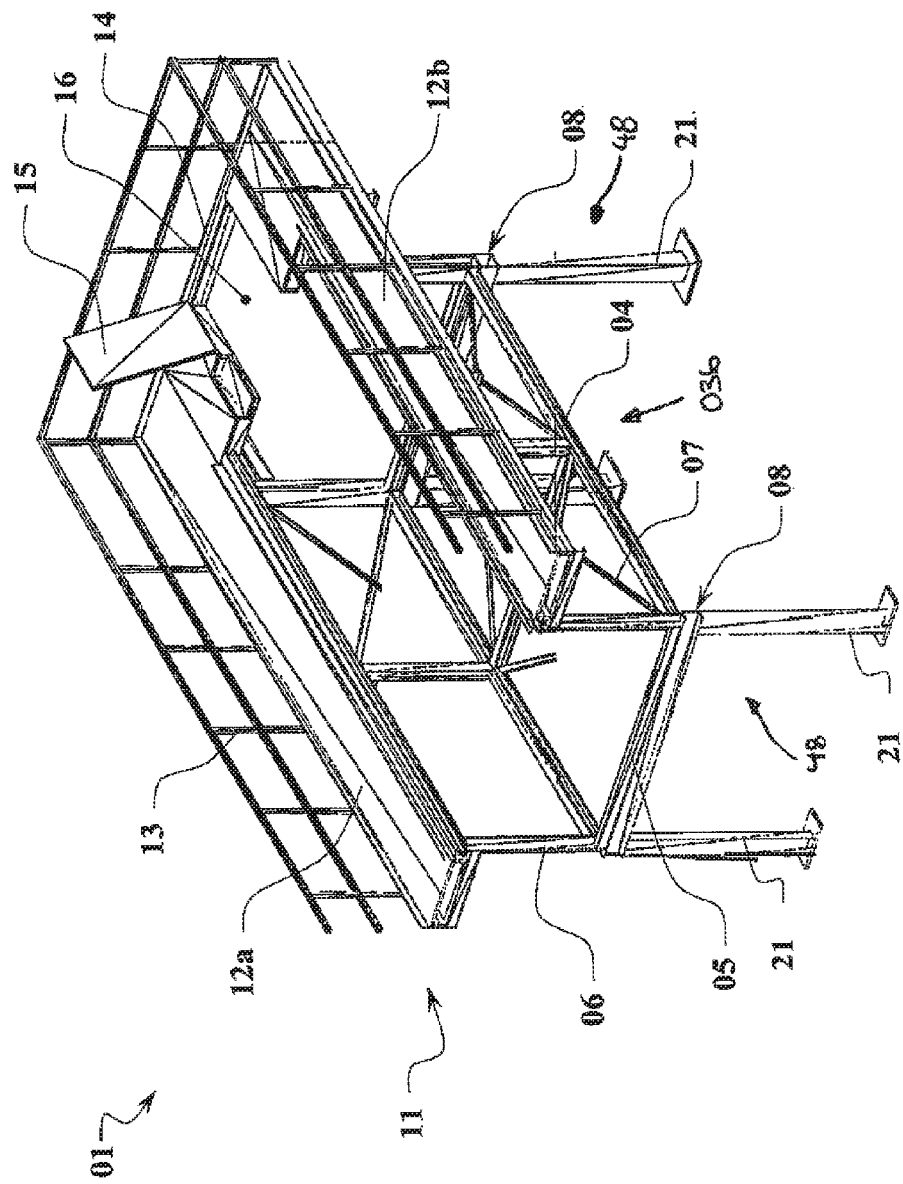
FIG. 3 shows a half-section of the overhead conveying device in accordance with FIG. 1.
Figure 4:
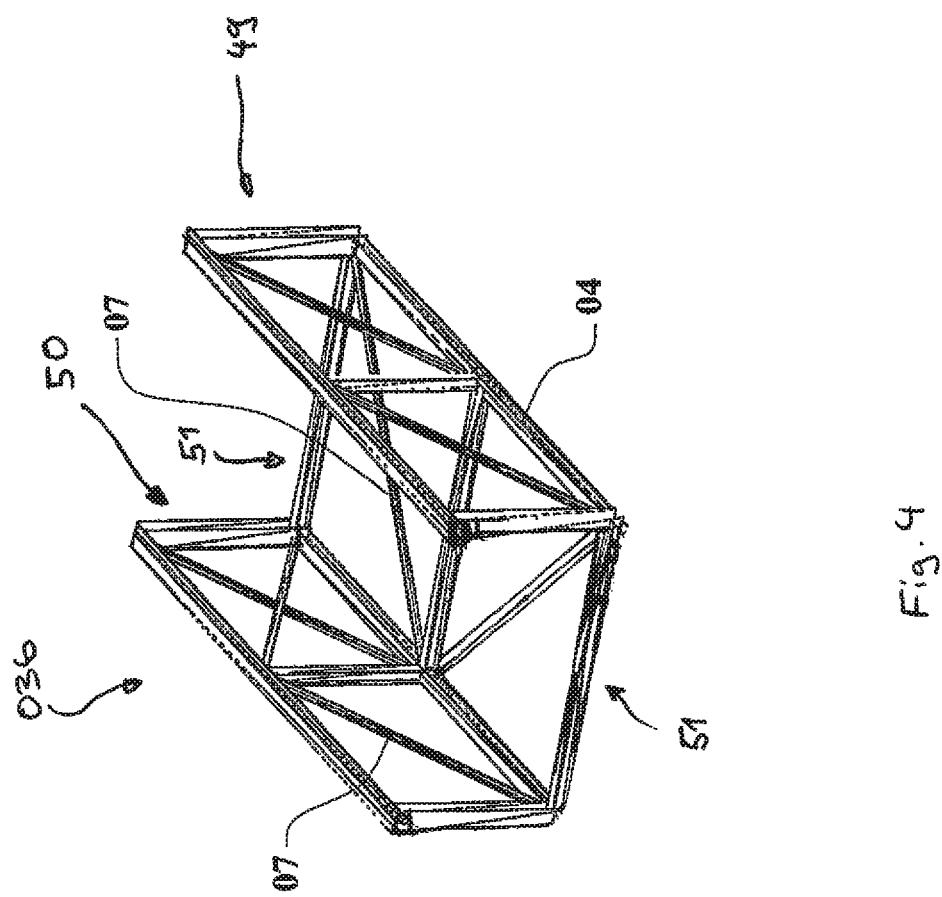
FIG. 4 shows a supporting framework module of the overhead conveying device in accordance with FIG. 1 in a perspective view.

In FIG. 1, a perspective illustration of an overhead conveying device 01 is outlined in an exemplary embodiment. Here, the conveying device that belongs to the overhead conveying device 01 was chosen not to be illustrated. The same is located, as the person skilled in the art will easily be able to understand, in the center of the supporting framework 03, protruding well beyond the supporting framework 03, depending on the embodiment. The arrangement of the conveying device can also be seen from FIG. 7. The supporting framework 03 consists of two supporting framework modules 03a and 03b arranged one after the other. Here, each of the supporting framework modules 03a and 03b is designed in the manner of a truss and comprises a multiplicity of supporting beam elements 04-07 that are welded together. As it can be seen from FIG. 4 in this regard, the supporting framework modules 03a and 03b are formed by longitudinally oriented supporting beam elements 04, transversely oriented supporting beam elements 05, upright supporting beam elements 06 as well as diagonal supporting beam elements 07. Here, the supporting framework modules 03a and 03b having the supporting beam elements 04, 05, 06 and 07 are designed such that, when the conveying device has been mounted thereon, there is sufficient self-supporting inherent stiffness, so that it is possible to transport the entire overhead conveying device 01 or at least individual supporting framework modules 03a or 3b having the conveying device mounted thereon. For this purpose, each of the supporting framework modules 03a and 03b is composed of two side parts 49 and 50 and of a floor part 51. The side parts 49 and 50 and the floor part 51 each have an even component structure of high stiffness in the component plane. The side parts 49 and 50 and the floor part 51 are put together from the supporting beam elements 04, 05, 06 and 07. In view of stiffness, in particular bending stiffness, the supporting framework 03 is to be configured to the effect that bearing on the associated column gantries 48 is possible in a substantially deformation-free manner both in case of transport and for later erection.

In correspondence to the static configuration of the overhead conveying device 01, which has to be ascertained in each case, the supporting framework 03 is borne on a plurality of column gantries 48. Each column gantry 48 consists of at least two support columns 21 and of a transverse bridge 08 affixed in-between. Furthermore, in this embodiment example, the statics of the supporting framework 03 are configured and the stiffness is selected in such a manner that the stability of the entire arrangement is guaranteed even if individual support columns are omitted. Thus, it is conceivable on the one hand to employ only five of the illustrated six support columns 21 in case of erection in the assembly plant, and on the other hand it is also possible to use six support columns, in which case a support column can be replaced in case of damage resulting from a collision with a vehicle, for instance, without impairing the functionality of the overhead conveying device.

Figure 5:
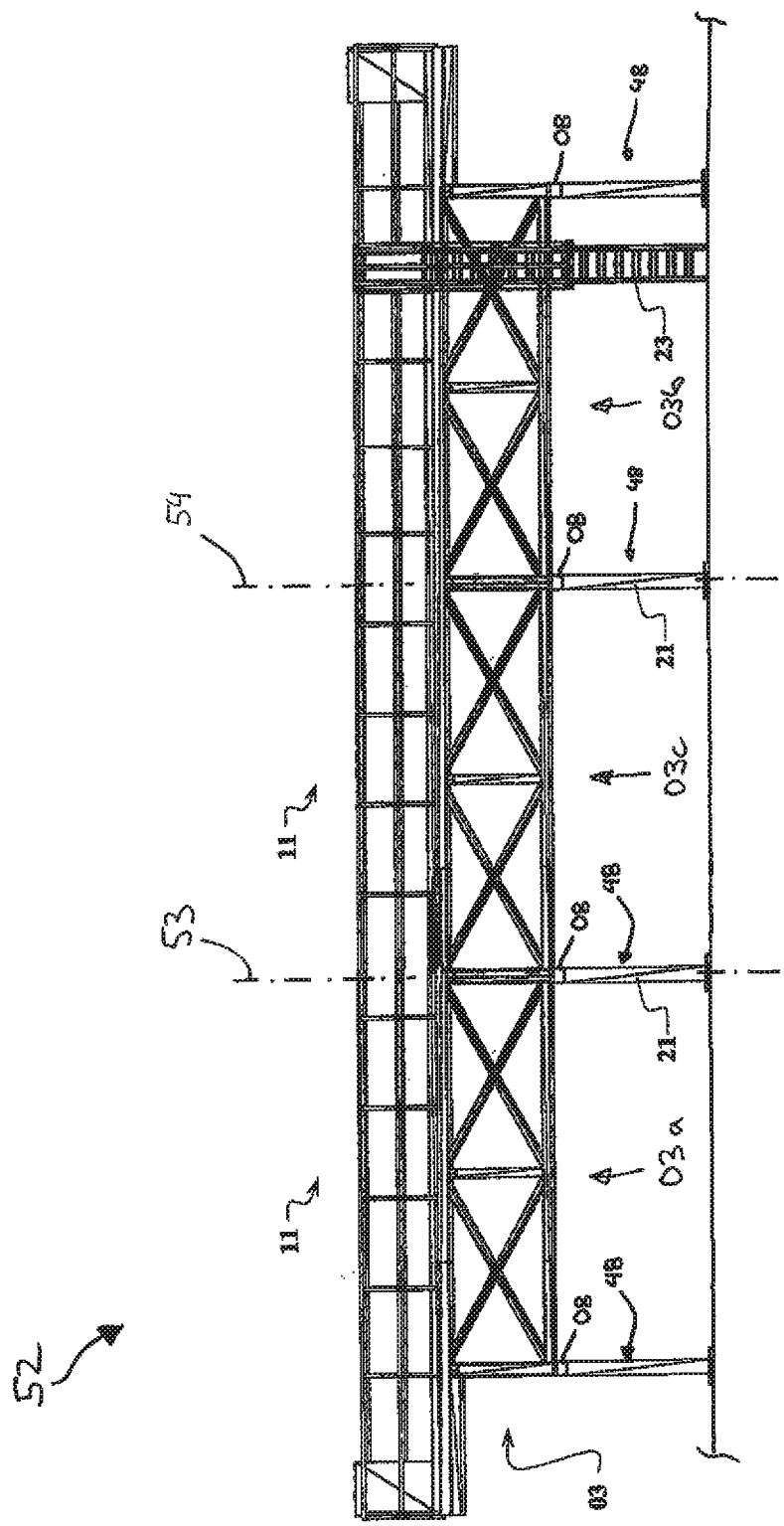
FIG. 5 shows a second exemplary overhead conveying device consisting of three supporting framework modules in a lateral view.
Figure 9:
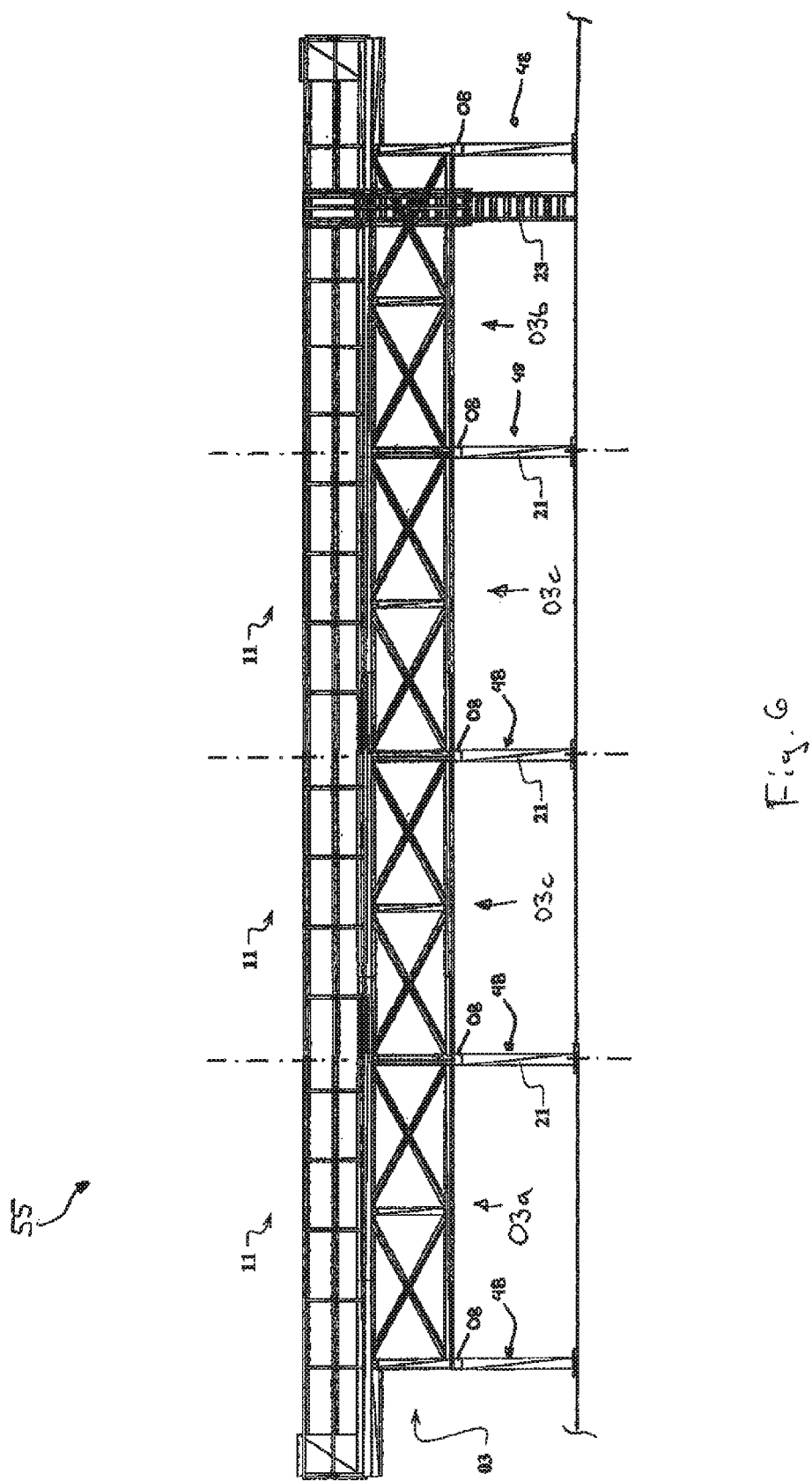

FIG. 5 shows a second exemplary overhead conveying device 52 whose composition is derived from the overhead conveying device 01. The overhead conveying device 52 consists of the input supporting framework module 03a and of the output supporting framework module 03b, which are already used for manufacturing the overhead conveying device 01. In addition, the overhead conveying device 51 comprises an intermediate supporting framework module 03c in order to correspondingly enlarge the length of the overhead conveying device in this manner. In this context, the individual supporting framework modules 03a, 03b and 03c are connected to one another in the intermediate planes 53 and 54 by means of fastening devices. In the separating planes 53 and 54, the adjacent supporting framework modules 03a, 03b and 03c have together been placed onto one column gantry 48 in each instance. Also, compensating elements are arranged in the intermediate planes 53 and 54 in order to cushion vibrations and to relieve thermal stresses.

FIG. 6 shows a third exemplary overhead conveying device 55, which has been derived from the supporting framework module 52. For manufacturing the supporting framework module 55, an input supporting framework module 03a, an output supporting framework module 03b and two intermediate supporting framework modules 03c that are identical in construction are combined with one another and have been arranged one after another. The two intermediate supporting framework modules 03c, which have been manufactured in batch production, are substantially identical in construction and can thus be manufactured very cost-efficiently by mass-production.

Figure 7:
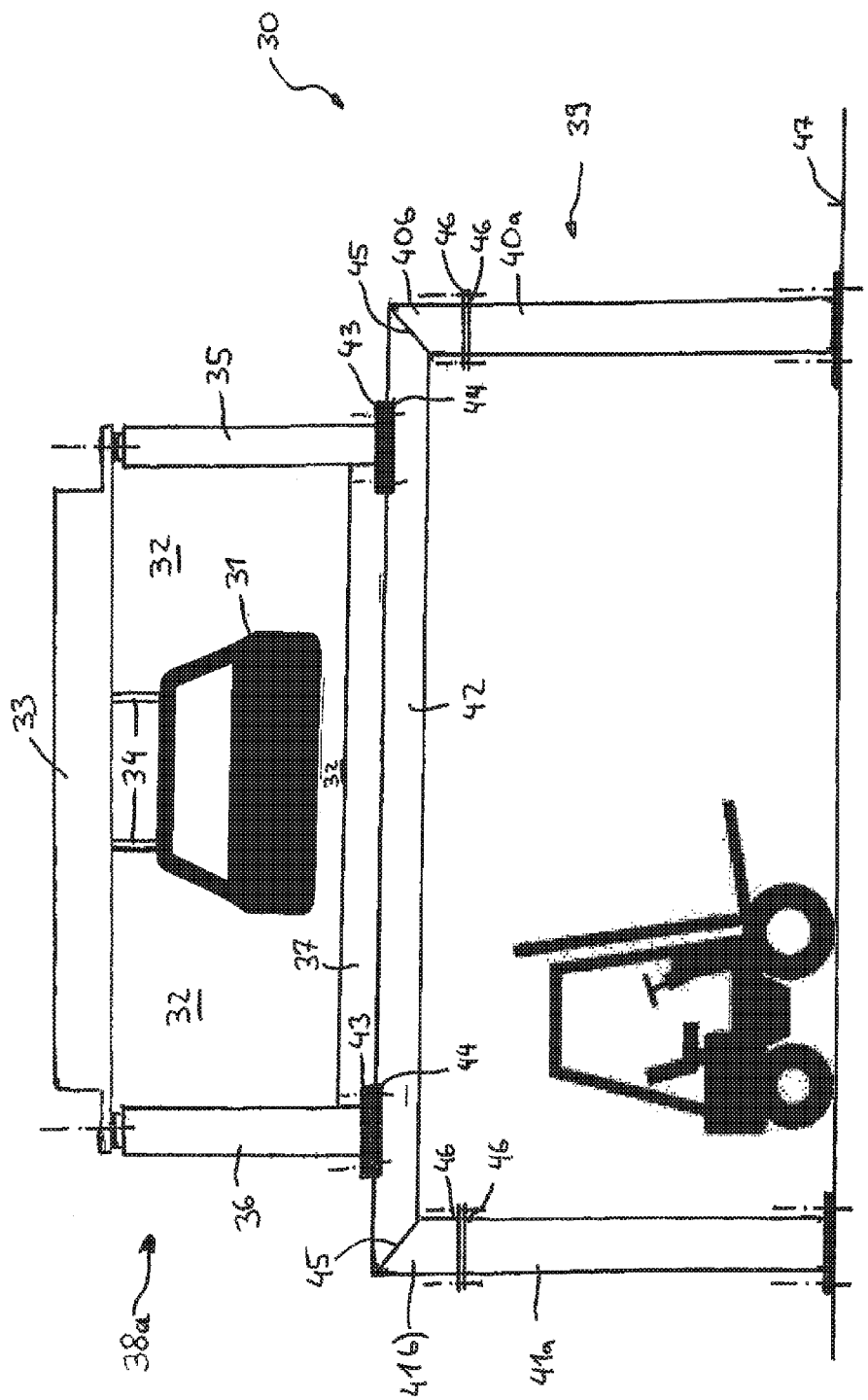
FIG. 7 shows an overhead conveying device in a schematized view from the front.

FIG. 7 shows a second overhead conveying device 30 in a view from the front. The overhead conveying device 30 is intended for transporting vehicle components 31 along a conveying corridor 32. In this context, the actual conveying movement for transporting the vehicle components 31 is effected by a conveying device 33, such as a push conveyor. The conveying device 33 has been fastened to the vehicle components 31 with the aid of coupling members 34. The conveying device 33 itself, at the sides, has been placed onto two side parts 35 and 36 and fastened thereto. The side parts 35 and 36 are connected to each other below the conveying corridor 32 by a floor part 37. The two side parts 35 and 36 and the floor part 37 together form a supporting framework 38, which has a U-shaped chamfer shape and limits the conveying corridor 32 laterally and from below. The supporting framework 38 consists of supporting framework modules 38a and 38b (not illustrated in FIG. 7) arranged one after another and is designed so as to be self-supporting. The supporting framework modules 38a and 38b can be transported in preassembled form from a place of manufacture to the place of use. The supporting framework 38 that is designed so as to be self-supporting, for manufacturing the overhead conveying device 30, is placed, from the top, onto several column gantries 39 arranged one after another, and is fastened thereto. Each column gantry consists of two support columns 40 and 41 and of a transverse bridge 42 affixed between the two support columns 40 and 41. Fastening straps 43 and 44 are in each instance disposed at the lower ends of the side parts 35 and 36 and at the upper side of the transverse bridge 42, said fastening straps making it possible to align the supporting framework 38 on the column gantries 39 and to fix them subsequently. The support columns 40 and 41 as well as the transverse bridge 42 have been manufactured from rectangular tubes and are in each instance miter-cut at their adjoining ends, so that the surfaces of the end cross-sections of the two support columns come into flush contact with the surfaces of the end cross-sections of the transverse bridge. To connect the support columns 40 and 41 and the transverse bridge 42, the miter-cut end cross-sections have been welded together by means of welded seams 45.

In order to be able to transport the column gantries within very little transport space, the two support columns can be disassembled into two parts. For this purpose, connecting points 46 are in each instance disposed at the support columns 40 and 41, the support columns 40 and 41 being able to be disassembled into two parts 40a and 40b or 41a and 41b at said points.

The invention claimed is:

1. An overhead conveying device for integration in an assembly plant in order to transport components, said overhead conveying device comprising:
    a supporting framework having a length greater than 5 m and a width greater than 2 m;
    a conveying device mounted on the supporting framework, wherein the supporting framework and the conveying device form a conveying corridor, in which components can be transported in a direction of the conveying corridor from an input point to an output point; and
    support columns supporting the supporting framework wherein a free space suitable for component assembly and/or component transport and which can be walked and/or driven through is formed beneath the supporting framework wherein the supporting framework is formed from at least two supporting framework modules arranged one after another in the direction of the conveying corridor;
    wherein the supporting framework modules are designed in the manner of a spatial truss and include longitudinally and transversely oriented and diagonal and upright interconnected supporting beam elements having a closed tubular cross-section.

2. The overhead conveying device according to claim 1, in which the supporting framework modules, at a transition to adjacent supporting framework modules, have fastening devices, which make it possible to connect adjacent supporting framework modules.

3. The overhead conveying device according to claim 1, in which the overhead conveying device has an input supporting framework module, at which the input point for the components is disposed, and an output supporting framework module, at which the output point for the components is disposed.

4. The overhead conveying device according to claim 3, in which an intermediate supporting framework module is disposed between the input supporting framework module and the output supporting framework module.

5. The overhead conveying device according to claim 4, including several intermediate supporting framework modules, wherein the intermediate supporting framework modules are substantially identical in construction.

6. The overhead conveying device according to claim 1, in which compensating elements between adjacent supporting framework modules, cushion vibrations between the supporting framework modules and/or relieve thermal stresses.

7. The overhead conveying device according to claim 1, in which at least two of said support columns form part of a column gantry disposed at least one supporting framework module, wherein the at least two support columns, whose lower ends are affixed on a floor of the assembly plant, and wherein at least one transverse bridge is affixed between the two support columns, and wherein the supporting framework module is arranged on the upper side of the transverse bridge.

8. The overhead conveying device according to claim 1, in which the supporting framework modules are self-supporting and can be transported in preassembled form.

9. The overhead conveying device according to claim 1, in which the supporting framework modules include at least two side parts extending parallel to a longitudinal axis of the conveying corridor and limiting a cross-section of the conveying corridor to the right and to the left.

10. The overhead conveying device according to claim 9, in which the conveying device is mounted between the two side parts and limits the cross-section of the conveying corridor from the top.

11. The overhead conveying device according to claim 1, in which each of the supporting framework modules include at least one floor part, which limits a cross-section of the conveying corridor from below.

12. The overhead conveying device according to claim 1, in which a maintenance walkway is affixed to at least one supporting framework module along a longitudinal side of the conveying device.

13. The overhead conveying device according to claim 1, in which the supporting framework modules are welded structures.

* * * * *